United States Patent [19]

Wagner

[11] E Re. 29,808

[45] Reissued Oct. 24, 1978

[54] HOLLOW BODY GRINDING MATERIALS

[75] Inventor: Eckhard Wagner, Elmshorn, Germany

[73] Assignee: Norddeutsche Schleifmittel-Indutrie Christiansen & Co., Hamburg, Germany

[21] Appl. No.: 832,516

[22] Filed: Sep. 12, 1977

Related U.S. Patent Documents

Reissue of:

[64] Patent No.: 3,928,949
Issued: Dec. 30, 1975
Appl. No.: 465,802
Filed: May 1, 1974

[30] Foreign Application Priority Data

Sep. 26, 1973 [DE] Fed. Rep. of Germany ..... 2348338
Oct. 5, 1973 [DE] Fed. Rep. of Germany ..... 2350139

[51] Int. Cl.[2] ..... B24D 3/34

[52] U.S. Cl. ..... 51/401; 51/296

[58] Field of Search ..... 51/164.5, 358, 394–402, 51/204, 295, 296, 298, 308, 309

[56] References Cited

U.S. PATENT DOCUMENTS

| | | | |
|---|---|---|---|
| 1,956,905 | 5/1934 | Merriam | 51/296 |
| 2,248,990 | 7/1941 | Heany | 51/308 |
| 2,290,877 | 7/1942 | Heany | 51/309 |
| 2,986,455 | 5/1961 | Sandmeyer | 51/298 X |
| 3,316,073 | 4/1967 | Kelso | 51/309 |
| 3,321,287 | 5/1967 | Hunsberger | 51/308 |
| 3,356,473 | 12/1967 | Hull | 51/309 |

*Primary Examiner*—N. P. Godici
*Attorney, Agent, or Firm*—Sherman & Shalloway

[57] ABSTRACT

A grinding material comprising a multiplicity of hollow bodies whose walls are formed of abrasive grains and a bonding means and are arranged to be stable in resistance to grinding forces.

23 Claims, 7 Drawing Figures

HOLLOW BODY GRINDING MATERIALS

Figure 1:
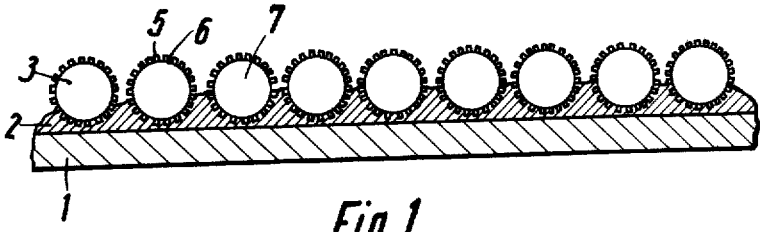

Matter enclosed in heavy brackets [ ] appears in the original patent but forms no part of this reissue specification; matter printed in italics indicates the additions made by reissue.

This invention relates to grinding materials in which a multiplicity of abrasive grains are held in a bonding material to form a unit.

Such a grinding material may be formed as a tool having an abrasive surface (that is a surface of the grinding tool for acting on a workpiece).

Preferably, apart from the abrasive grains, the abrasive surface has pores to receive ground-off waste material and containing if required a coolant or grinding adjuvant. The porosity within the body of a grinding tool can be increased by adding pore-forming substances. For example particles can be incorporated which volatilise during the processing of the tool U.S. Pat. No. 1,956,905, third paragraph). Since firm mutual bonding of the abrasive grains must be maintained, such pore-forming substances may however only be added in small quantities. The pore volume attainable is therefore restricted and it must be anticipated that there will be found considerable, statistically differing distances between each abrasive grain and the nearest pore for accommodating waste. It is also known to add hollow beads, filled with a grinding adjuvant, to the bonding material of a grinding tool (Swiss Pat. No. 511,678). If the mechanical strength of the grinding tool is not to be endangered, the hollow beads must however be very small, i.e. substantially smaller than the average dimensions of the abrasive grains. They are not suitable therefore for forming pores of any substantial volume. Also, it is known to produce a grinding tool from a cellular bonding framework, to whose walls the abrasive grains are bonded firmly (Swiss Pat. No. 257,484). Such a construction is only useful if small quantities of an expensive granular material, for example diamond, can be obtained in a substantially larger quantity of the bonding framework. For normal grinding purposes such a grinding body could not be considered.

According to this invention there is provided a grinding material comprising a multiplicity of hollow bodies whose walls are formed of abrasive grains and a bonding means and are arranged to be stable in resistance to grinding forces.

Preferably all the abrasive grains forming the grinding material are disposed in the hollow body walls.

Thus there is provided a grinding material having a large pore volume without the mechanical strength of a grinding tool made from the material being endangered by a diminution of the grain coherency. The pore volume is not restricted by the size of the abrasive grains, since even grinding materials with fine grains can be provided with pores of large individual volume. The size of the individual pores and their distance from the individual abrasive grains can be made so as to vary statistically only within narrow limits, and the individual pores can lie in a predetermined size range, their distances from the individual grains being equal within narrow limits. In this way, a grinding material can be obtained whose abrasive properties, insofar as they are determined by the grain size and the pore volume, are predetermined over wide ranges, as is the case with known grinding materials.

The grinding material can be utilised in different forms. For example, it may be used in the form of ballast of the hollow bodies in polishing drums or rumbles. Here, the advantage is obtained that a given quantity of ballast, which in general is determined by the size and shape of the polishing drum, and also by the size and nature of the articles to be polished, can be provided by a comparatively small quantity of the abrasive grains. If the hollow bodies are gas-filled, they may also have a very low specific gravity and the ballast may be correspondingly looser, which is favourable for a uniform abrasive action. It will be noticed that the uniform grinding action is still retained when the hollow bodies break up after a certain time, and act not by their outer surfaces but by the broken surface of their constituent pieces.

In using the hollow bodies for the production of grinding tools (particularly grinding discs) it is a considerable advantage that the desired porosity of the grinding body is attained in an accurately predeterminable manner, and also that the pores are directly adjacent to the abrasive grains. Each hollow body begins its grinding action with only its outer surface. As wear of the grinding surface (the abrasively-acting surface of the grinding tool) develops, the hollow bodies breaks open so that their cavities open in the manner of craters. The effective abrasive surface of each hollow body is then formed by the crater rim which is directly adjacent to the crater which can receive the ground-off waste and any breaking-away grains. This advantage makes itself felt particularly forcefully with those present-day grinding processes in which lubricating substances are present which may emanate from the bonding material of the grinding material or from the workpiece, particularly when processing soft metals or using grinding tools bonded by synthetic resin, by rubber or metallically. However, the hollow bodies are also suitable for ceramic bonding. In any case, the effective cutting power is improved. A further advantage lies in that the inter-connecting of the individual abrasive grains in the hollow body walls is not deleteriously affected by the pores, and the hollow body walls therefore form a framework which has a higher mechanical strength than known grinding tools with comparable total pore volume. Grinding discs employing the hollow bodies can therefore be operated at higher peripheral speeds. The cutting ratio (the ratio of the grinding material wear to the ground-off material) is thereby improved. Furthermore the size of the volume of the individual pores is not restricted by the grain size, as the hollow body walls can be assembled as required from small or large grains. The pores can be filled with an auxiliary grinding material.

It is already known to construct grinding tools from hollow balls of grinding material (U.S. Pat. No. 2,986,455), but here hollow balls are melted exclusively and in one piece from a hard material, particularly corundum. Such hollow balls can be initially broken up only under the action of powerful forces, which forces can vary widely with different individual balls. The uncontrolled jagged fracture rim behaves in a manner which, from the point of view of grinding technique, is incalculable and in any case completely different from that of the hollow ball outer surface. Furthermore the danger exists that stray hollow ball particles could scratch the surface to be machined. By contrast an essential advantage of the grinding material in accordance with the invention lies in the uniformity of the grinding action which depends exclusively on the grain size selected.

The use of the grinding material in accordance with the invention in the form of flat grinding tools, for example abrasive belts, is particularly preferred.

With known flat grinding tools, in which a grain layer or a few grain layers, is or are connected by means of a bonding material on a backing, the grinding power varies and the surface quality obtained varies with the degree of wear. During the life of the tool the "peak-to-valley height" decreases. It primarily corresponds to the mean grain diameter and therefore decreases with increasing wear of the grinding material, until the belt has to be replaced for lack of sufficient grinding power. If any this point of time the surface quality aimed at, of the workpiece, has not yet been reached, then it is not possible to attain it with a new belt of the same grain size, since initially the roughing depth is greater again, so that the surface quality already obtained would be destroyed. Vice Versa, if a satisfactory surface of the workpiece has already been obtained before the abrasive power of the abrasive belt is exhausted, the half-used belt can no longer be used for the same grinding operation, since the peak-to-valley height is already too small or since the residual abrasive power is no longer sufficient for completely processing the next workpiece.

By contrast it has been found that abrasive belts employing hollow bodies in accordance with the invention have a considerably longer working life with constant abrasive properties. The hollow body walls containing the abrasive grains continuously make fresh abrasive grains available, whereby a large portion of the grinding surface is continuously available for accommodating the abrasive grains used up and the ground-off waste, and also any coolant present. This pore proportion of the grinding surface hardly varies in size even when the hollow bodies are worn. This characteristic is also possessed by abrasive belts in which the hollow bodies are initially closed, for example in the form of hollow balls. These hollow balls engage the workpiece first of all by the abrasive grains located on their outer surface, break up after a short time, thus forming a crater in each hollow body, the diameter of which crater increases as wear continues till the size is reached of the hollow body diameter, and at its boundary a rim or crown of abrasive grains if left free. The properties of the grinding means only start to alter when the grinding surface, after heavy wear of the hollow body walls, approaches the base of the cavity in the hollow bodies and therefore sufficient accommodation volume is no longer available.

The property, that the hollow body walls are stable and form-resistant to the grinding forces is therefore essential for the invention, so that as the grinding process continues they are worn uniformly without being able to break off in large lumps and without being compressed elastically or plastically. Filling of the hollow bodies with grinding adjuvants is, only permissible within the scope of the invention insofar as the self-supporting property of the hollow body walls is not thereby affected. This distinguishes the flat grinding tools employing hollow bodies in accordance with the invention from those known abrasive belts (German Pat. No. 884,004, British patent specification No. 860,920), in which the abrasive grains lie in a layer of bonding means on a flexible backing of individual particles of cork or expanded vermiculite.

The thickness of the abrasive-grain-holding wall of the hollow body may lie in particular in the range up to 10, but preferably up to 3, abrasive grain diameters. As dense an abrasive grain arrangement as possible is sought. In most cases a substantially single-layer arrangement of the abrasive grain in the walls of the hollow body is sufficient. It has therefore been sought to produce as stable and dense as possible a hollow body sheath consisting of abrasive grains and a suitable bonding material. The arrangement is all the denser or more tightly-packed, the less is the distance apart of the abrasive grains, and the more completely the wall surface appears coated with the abrasive grains. A coating of more than 50% of the surface available in each abrasive grain layer is aimed at. The maximum, where all the grains are in contact with one another, lies at 80%. A further measure for the density of the grain arrangement in the hollow body walls is given by the volume ratio of abrasive grains to the bonding means. The weight ratio, which substantially corresponds to the volume ratio, is easier to determine, as the specific gravity of the synthetic resin bonding means (about 1 g/cc) and abrasive grains (about 3–4 g/cc) used in practice, only differ negligibly. It can therefore be assumed that the proportion of bonding means in the hollow body walls by weight is advantageously not greater than twice, and preferably not greater than once and preferably again not greater than 0.3 times the gran content. A weight ratio of about 1:10 has proved very advantageous. It is the proportion of the bonding means in the solid condition that is meant. Synthetic resins have proved favourable as bonding means. However, ceramic or metallic bonders can also be used. In the interests of the maximum possible stability, the hollow bodies are made preferably substantially in the form of a hollow sphere. They may however also be made cylindrical or of some other shape, but preferably are closed on all sides. A hollow cylindrical construction with both or one ends open, is however not excluded.

A hollow-spherical construction has proved particularly favourable with those grinding materials which have to stand up to high grinding pressure or resist powerful centrifugal forces, and also with those grinding materials where high requirements are set regarding uniform particle size, such as for instance abrasive or polishing belts.

The hollow bodies may consist exclusively of a closed wall formed from abrasive grain and bonding means. Such hollow bodies are obtained for example by blowing up granulates consisting of abrasive grain and bonding material or by ensheathing carrier particles which disappear as the bonding material binding the grain hardens out, as they evaporate or decompose. For example ceramically-bonded abrasive grain sheaths can be built up on organic carrier particles which volatilise on combustion. Again when using synthetic resin as bonding material, which is subjected for hardening out to a high temperature, the carrier body can disappear or lose its original form if it is fluid or gaseous at the final hardening temperature. No harm is done however if the finished hollow body still contains completely or partially, a carrier particle, provided the carrier particles does not act unfavourably in the grinding process. When using hollow bodies in the form of a ballast the individual hollow bodies easily break up so that in most cases there is no question of anything in the nature of a carrier particle. It may in such a connection even be advantageous to have a carrier particle if it is comparatively stable, in order to support the hollow body from within against the grinding forces. In all of the cases, however, in which during grinding a breaking-up of the hollow body and its wear on one side are to be anticipated, that is to say with all grinding material present in a fixedly-bonded form, all the constituents participating in the formation of the hollow body, including any possible filling of the hollow body, should be more easily removable under grinding conditions than the wall, consisting of abrasive grain and bonding material, of the hollow body. A measure of the innocuousness of the filling of a hollow body, if such is present, is the difference in frictional forces which is found with and without filling, other conditions being the same. The frictional force produced by the filling alone should not be greater than one-fifth of that of the wall of the hollow body and preferably should be less than one-twentieth. If only some of the hollow bodies are filled then the frictional proportion of the individual filling in relation to the frictional stress of the hollow body wall in question, may be greater. It should however not exceed the ratio 1:1. This applied both for any carrier particles or their remainders in the hollow body and also for other fillers, for example grinding adjuvants.

From these points of view, a carrier particle is preferred which takes the form of a thin-walled hollow bead. It preferably consists of a thermoplastic material. The hollow bead of Belgian Pat. No. 702,673 has proved very suitable for this purpose. If the mechanical strength required for the hollow body is obtained from the envelope or sheath itself, consisting of bonding material and abrasive grain, the carrier particle need only have a slight mechanical strength, as it is merely a matrix for the production of the envelope or sheath. It can in fact even volatilise during the further processing of the grinding means, for instance during the treatment at high temperatures, or can be disposed of in any manner desired, in particlar it may be allowed to run together in the zone of the cavity near the base. In this way it can be removed from the active grinding zone of the sheath, which may be advantageous for the abrasive action, as this is not affected by the presence of residues of the carrier particle. As the carrier particle, taking the form of a hollow bead, may however be very thin-walled, normally no harm is done even if it remains present in the grinding zone, as it is made so slight by contrast with the sheath, that it cannot take over any significant part of the grinding pressure nor can it exert substantial frictional forces.

This does not necessarily mean that the carrier particle has to consist of a very soft material; it may consist of a hard, but brittle material, provided that through its being given a thin-wall it is ensured that its mechanical strength is substantially less than that of the wall of the hollow body, so that with increasing wear of the hollow body wall the carrier particle is removed by the grinding pressure, for instance is successively broken away, without however, because of the low forces thereby occurring and the small quantity of material thereby involved, affecting the grinding process. Such brittle thin carrier particles can however be utilised for supporting the sheath.

The carrier particles could even fill the hollow bodies (or some of them) completely, provided they are soft enough. As they are only supposed to serve as matrices for the formation of the sheath, their inherent strength need not be great. They may, therefore, consist of a powdery substance, or a substance which at grinding temperatures is soft or even fluid, or evaporates. They are of course so selected that they do not have a deleterious effect on the grinding process, but preferably a favourable one. For example they could be a grinding lubricant. It is also possible for carrier particles, made hollow, to be filled with grinding lubricant.

The size of the hollow bodies should be as uniform as possible. It should further lie in a given proportion to the mean diameter of the abrasive grain, that is to say it has proved advantageous if the mean hollow body overall diameter is 3 to 50 times, and in particular 6 to 20 times, as great as the mean abrasive grain diameter.

The mean overall diameter of the hollow body, measured parallel to the grinding surface, preferably lies between 0.1 to 8 mm, in particular between 0.2 and 2 mm.

In the production of the hollow bodies the preferable procedure is for carrier particles to be mixed in a tacky condition with the abrasive grain. The carrier particles can be brought into the tacky condition by themselves i.e. without the addition of an adhesive, if for example they are heated to their softening temperature before mixing with the abrasive grain, when for instance they consist of a thermoplastic material. Whether the carrier particles consist of a thermoplastic of a non-thermoplastic synthetic resin, they can also be mixed with the abrasive grain before their material is completely polymerized and they are therefore still tacky. In those cases in which the carrier particles themselves are tacky and soft, they are preferably mixed with the abrasive grain in a fluidized bed process.

Obviously this process is also applicable when the particles have been rendered tacky by wetting with a bonding material. However in such a case it is usually simpler and therefore more advantageous to effect the mixing mechanically during the filling, for example in a moving drum.

When using the hollow balls for producing a grinding body, the said hollow balls can be processed in the same way as has long been done with the abrasive grains, i.e. during the production of a grinding body they are mixed with a bonding material and brought into the shape of the grinding body, after which the bonding material is allowed to harden out, and during the production of an abrasive belt the hollow bodies are bonded in the usual manner to a base material.

Figure 2:
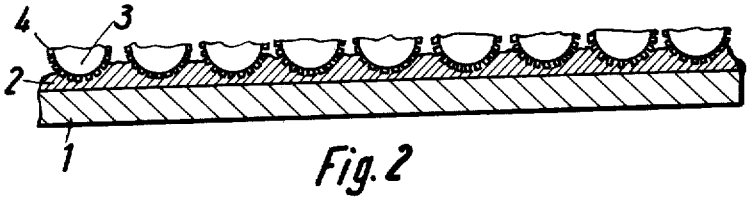
Figure 3:
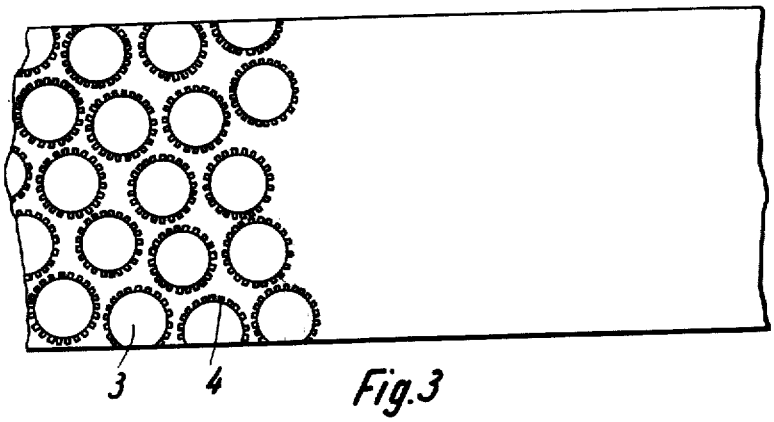
Figure 4:
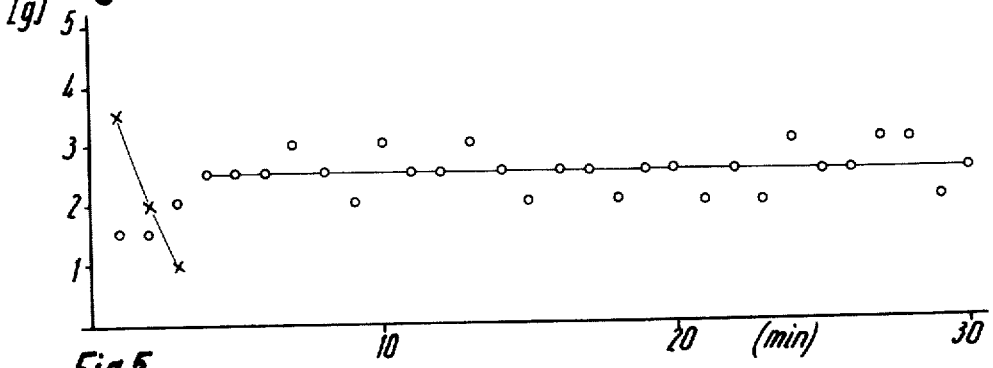

The invention will be explained in more detail in the following description of examples which is made with reference to the accompanying drawings, in which:

FIG. 1 is a cross-section on an enlarged scale through an abrasive belt when new, FIG. 2 shows the abrasive belt of FIG. 1 when half worn away, FIG. 3 is a plan view of the abrasive belt of FIG. 2, FIGS. 4 to 6 are diagrams of comparative tests on the abrasive belt of FIGS. 1 to 3 and FIG. 7 is a cross-section through a grinding body on an enlarged scale.

In FIGS. 1 to 3, a base 1 has affixed thereto by a layer 2 of bonding material hollow bodies 3. The walls of the hollow bodies 3 consist of abrasive grains 5 held in place by bonding means 6. When bodies 3 are ground to a half-worn condition, as is clearly visible, in FIGS. 2 and 3 there is formed a crown or rim 4 of grains 5. It can be seen that the coating of abrasive grains 5 is only one layer thick, and surrounds the whole cavity 7 of each body 3. A substantial part of the bonding means 6 is located on the inside of the hollow body wall to bond the grains 5 to hollow beads which act as matrices for bodies 3. Of course a further part of the bonding means 6 is located directly between the grains and some even on their outsides.

EXAMPLE 1

Hollow beads which have been produced by expanding vinyl-chloride/ethylene copolymers in accordance with Belgian Pat. No. 702,673, with diameters from 0.05 to 1.00 mm, were wetted in a mixer with a bonding material consisting of a 40% solution of an epoxy resin of the bisphenol-A-epichlorohydrin type. The resin had an epoxy value of 0.200; the hardener was the polyamino-amide produced by the firm "General Mills" under the commercial name "Versamid 115" The solvent mixture consisted of 74% xylene, 13% butanol and 30% diacetone alcohol.

The hollow beads wetted with bonding material were mixed with electrocorundum of grain size 400 (mean grain diameter 35 μm) so that the abrasive grains are fixed substantially in one layer and tightly packed on the ball shell. The ratio by weight of hollow beads to solid bonding material to corundum, is 1:10:100. The abrasive grain balls were carefully dried and screened, only balls with a mean diameter of 0.425 mm being used.

A cotton twill fabric conventionally provided for producing abrasive belts was uniformly strewn, after the application of a layer of a phenol-formaldehyde resin, with the ready-prepared abrasive grain balls, which were given an intermediate drying in the usual manner, and, after being coated over with a further thin layer of the same resin, but thinned this time, hardened until final definitive anchoring of the hollow balls was obtained. After the completion of the hardening which (as usual) was carried out at temperatures of more than 120° C, the thin (c. 1 m) skin of the bead was melted, leaving only the bead sheath consisting of abrasive grain and bonding material.

An abrasive belt produced from this with the dimensions 17 × 2,000 mm, was tested on a belt grinding machine which was provided with a grooved rubber contact disc with a Shore hardness of 80 with a ratio of web width to groove width of 1:1. A surface grinding operation was carried out on a flat steel bar of ST 37 steel and the amount of material ground off was determined at intervals of 1 minute by weighing the workpiece. In order to compensate for differences in the material, the same piece of flat bar steel was used for both tests, i.e. on one narrow side for a conventional belt and on the other narrow side for the belt of this example. For purposes of comparison an abrasive belt produced in the usual conventional manner with the same fabric backing and grain size was tested. The results can be seen in FIG. 4.

It can be seen from the diagram that the belt of the conventional type used for comparison was blunt after 3 minutes, after it had finally achieved a very high abrasion rate. The new belt with hollow balls attained several times the grinding capacity, the abrasion rate remaining substantially constant with time.

After 30 minutes the test was broken off. The lower quantity of ground material per minute during the first 2 minutes indicated that the top of the hollow balls has to be torn off first before a uniform attack is obtained. When the grinding operation was ended the peak-to-valley height was measured. Here it was found that the peak-to-valley height attained with the abrasive belt of conventional type Rt = 5.15 m or a mean value $R_z$ = 3.7 μm, while the belt provided with the hollow balls by contrast had 8.0 μm or 5.1 as a mean value, which shows the unreduced satisfactory cut of the latter even after a grinding time of 30 minutes, by contrast with the rapid blunting of the conventional type of belt. The peak-to-valley height values are not indicated in the diagram.

EXAMPLE 2

The hollow beads of Example 1 were wetted with an aqueous dispersion of a terpolymer of butadiene-acrylonitrilestyrene with an average nitrile content and a styrene fraction of about 5%, and thereafter mixed with electrocorundum with a grain size of 280 (mean grain dia.52μm).

The weight ratio of hollow beads to bonding means to corundum was 1:8:80. The balls were dried and screened as in Example 1. The fabric backing and the mode of fixing the abrasive balls was again in Example 1.

A grinding test was carried out with a belt produced therefrom. The dimensions, the grinding machine and also the contact disc again corresponded to the arrangements as in Example 1. Again flat steel bar of ST 37 steel was ground.

Figure 5:
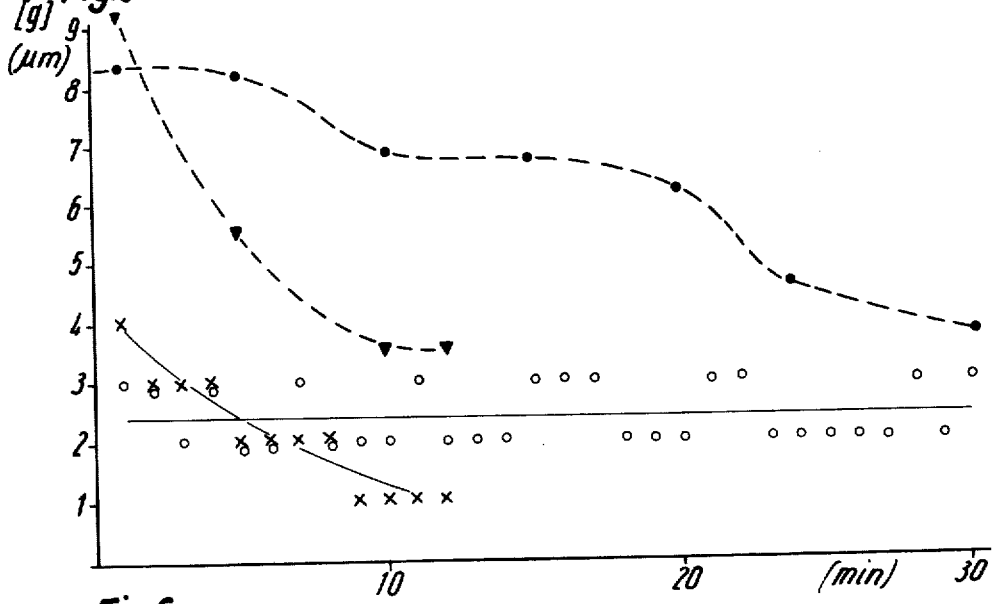

The results are shown in FIG. 5. A conventional abrasive belt with the same backing and grain size was taken off after 12 minutes, as during the last four intervals no further noticeable abrasion was attained. As a comparison the test was carried out with the belt of this example for 30 minutes. The values of the peak-to-valley heights measured at intervals of 4–6 minutes are shown in the graph in FIG. 5. They only vary slightly over a wide range, which was to be expected because of the uniform quantities of material ground off. The total quantity of material ground off with the conventional belt came to only about one-third of that with the new belt.

EXAMPLE 3

An abrasive belt with dimensions 50 × 2,000 mm was prepared as in Example 2 and tested for comparison with a conventional abrasive belt on a belt grinding machine.

The contact disc had a Shore hardness of 90. The material being ground was a seamless drawn tube with an overall diameter of 165 mm, a wall thickness of 5.1 to 5.8 mm, a Brinell hardness of 140 kg, soft-annealed to German Standard DIN 1629. A section of the tube was fed by the end face to the belt, rotating at 24 r.p.m. round the cylindrical axis. Feed was automatic as soon as the braking action, recognizable through the current consumption, left off. The intervals were 5 minutes long.

Figure 6:
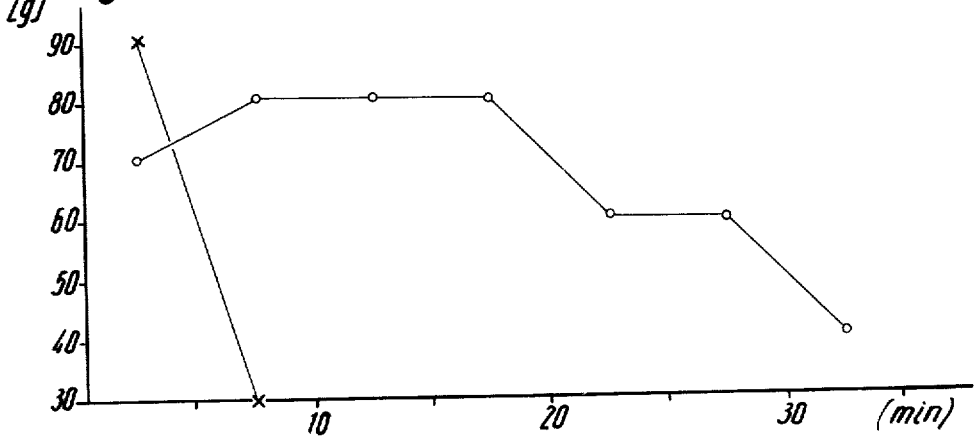

As can be seen from FIG. 6 the belt used for cparison was worn down after 10 minutes, having ground off 120 g of material. The belt of this example had ground off 470 g after 35 minutes, the individual values being unofrm over a wide range.

Abrasive belts according to the invention are suitable for grinding any desired materials, for instance metal, glass (glass-edge grinding), synthetic plastics material, ceramics or wood. They are particularly servicable also for wet grinding, as they have an outstanding capacity for accommodating water in the ball craters. Any desired underlays are also suitable, for instance woven fabrics, paper, vulcanized fibres, fleeces or random webs, foils or films. Belts, curved components, sheets and discs are preferred forms of application. Non-flexible backings can also be used, however.

For the hollow beads, silicate materials, glass, hardening synthetic resins (phenol resin, melamine resin, urea resin, epoxy resin, etc.), thermoplastic resins, gelatins and other processed or unprocessed natural substances have proved particularly suitable.

Any known bonding material can be used, both for fixing of the abrasive grains on the hollow bead surfaces and also for fixing the hollow bodies to the base.

Suitable abrasive grains are, for example, molten aluminium oxide, molten zirconium oxide, mixtures of these oxides, silicon carbide, diamond, flint, granite, emery and the like, and also polishing agents such as pumice stone, tripolite, rouge etc.

Figure 7:
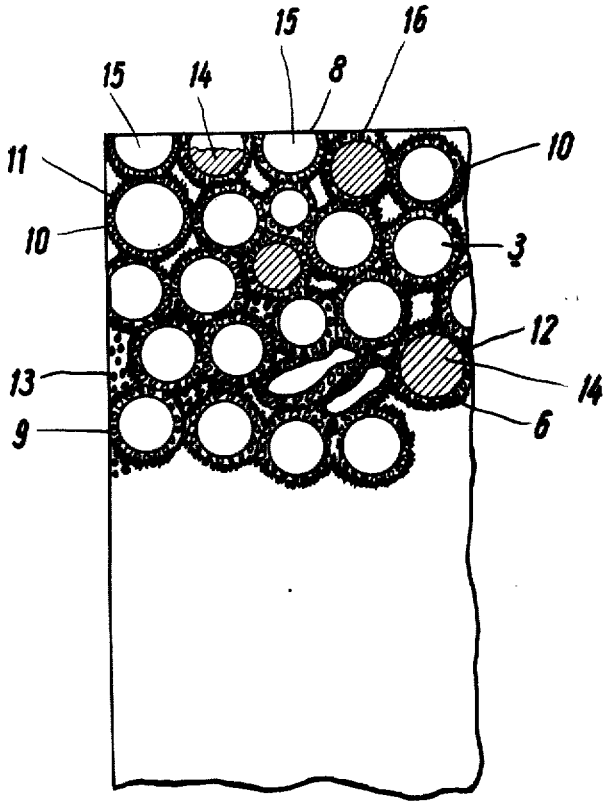

It is evident that hollow body walls primarily comprise the abrasive grains, the part of the bonding material located between the abrasive grains and also the bonding material by which the abrasive grains were fixed, during the production processes to the hollow beads and which, if and when the bead walls are removed (e.g. by melting), covers the inner surface of the abrasive grains in the manner of a skin. The bonding means may be considered as comprising the wall which provides on the outside of the hollow body a bond between the abrasive grains associated with the same hollow body, that is to say for example that part of the re-coating layer which is deposited on the hollow bodies in abrasive belts. The substances making up the hollow beads do no normally form part of the walls. At the most a thin hollow bead layer supporting the wall, without substantially reducing the cavity space, can be considered as part of the bonding means as it fulfils a function of the bonding means. In the section through a grinding body as shown in FIG. 7 there is shown at 8 the grinding surface while 9 is a lateral boundary surface of the grinding body not participating in the grinding process. The other two boundary lines are shown as thick wavy lines.

The grinding body comprises a multiplicity of hollow bodies 3, each consisting of a bubble type carrier particle 10, of, for instance, thermoplastic material, and a grain sheath 11 held by a bonding material (not shown) to the carrier particle. Depending on the nature and quantity of the bonding material used for bonding the grains to the carrier particle this is also directly effective between adjacent grains. Among themselves the hollow bodies are interconnected by a bonding material 12 ensheathing the individual hollow bodies. According to the quantity of the bonding material used this may completely fill the gusset-like cavities between the hollow bodies or merely cover their surfaces as in the example — shown the gusset-like cavities remaining unfilled. If it is desired to fill the gusset-like cavities, then the bonding material can be enriched with a given quantity of abrasive grains 13 or filler and/or grinding adjuvants, grains 13 being indicated by dots in the drawing, thus being differentiated from the hollow body grains which are indicated by peripheral lines only.

Some or all of the hollow bodies may be filled with a grinding adjuvant 14, for example a lubricant. The grinding adjuvant may be present in solid form, paste form, liquid form or as a gas.

It can be seen on the grinding surface 8 that some of the hollow bodies are broken up and therefore form large pores 15, while others 16 are still effective by their outer surfaces. It will further be seen that the pores are large by comparison with the grain size, while with known abrasive grains the pore size is normally smaller than the size of the grain.

With grinding bodies it is not absolutely necessary for the mechanical strength of the hollow body wall, substantially consisting of abrasive grains, to be predominantly determined by that part of the bonding means which bonds the abrasive grain to the carrier particle. The bonding of the grain to the carrier particle and the bonding of the abrasive grains to one another, effected during the production of the hollow bodies, need only be sufficiently strong for the hollow bodies to be able to withstand the stresses occurring during the subsequent production of the grinding body. The final mechanical strength, not only of the grinding body, but also of the hollow bodies, is preferably determined substantially by that part of the bonding means which wets the hollow bodies externally during the connection to the grinding body.

However the production of the grinding body can also be effected predominantly or exclusively by means of that bonding means which was used during the preceding production of the hollow bodies, since the hollow bodies are formed before the final hardening of this bonding means tightly packed to the grinding body.

During the production of grinding bodies the mechanical strength of the hollow body walls need only be strong enough to avoid deformations occuring during compression.

Grinding bodies according to the invention make a multiplicity of fresh abrasive grains continuously available at the grinding surface. In many cases therefore any dressing or sharpening of the grinding body can be dispensed with, or need only be carried out at longer intervals of time.

What we claim is:

1. A grinding material comprising a multiplicity of hollow bodies whose walls contain *substantially therein* abrasive grains in an amount of more than 50% of the wall surface and a bonding means selected from the group consisting of a synthetic resin, a ceramic binder and a metallic binder [and are] *for bonding said abrasive grains to each other at said wall surface, said walls being* arranged to be stable in resistance to grinding forces, the mean diameter of said hollow bodies [are] measured parallel to a grinding surface [lies] *lying* between 0.1 and 8 mm and [is] *being* not more than 50 times the mean grain diameter, [and the abrasive grains are contained substantially within the walls of the hollow bodies] *whereby during grinding a multiplicity of fresh abrasive grains become continuously available at the grinding surface wherein the grinding action of the grinding surface depends exclusively on the size of the abrasive grains*.

2. A grinding material as claimed in claim 1 wherein the thickness of the walls of the hollow bodies is on average less than 10 times the mean abrasive grain diameter.

3. A grinding material of claim 2 wherein the abrasive grains are disposed in the walls of the hollow bodies substantially in one layer.

4. A grinding material as claim in claim 1 wherein the abrasive grains are contained in the walls of the hollow bodies in a tightly-packed arrangement.

5. The grinding material of claim 4 wherein the bonding means content of the walls by weight is not greater than twice their grain content.

6. A grinding material as claim in claim 1 wherein the hollow body walls each surround a carrier particle, whose mechanical strength of resistance to the stresses occurring during grinding is substantially less than that of the hollow body walls.

7. A grinding material as claimed in claim 1 wherein all the constituents of the hollow bodies not participating in the formation of the walls are more easily removable under grinding conditions than the walls.

8. A grinding material as claimed in claim 7 wherein the frictional stress produced at a surface to be ground by the constituents of the hollow bodies not participating in the formation of the walls is less than a fifth of the frictional stress caused by the walls.

9. A grinding material as claimed in claim 6 wherein the carrier particle is thin-walled.

10. A grinding material as claimed in claim 7 wherein at least some of the hollow bodies contain a substance which is fluid under grinding conditions.

11. A grinding material as claimed in claim 7 wherein at least some of the hollow bodies contain a substance which is in powder form under grinding conditions.

12. A grinding material as claimed in claim 1 wherein the mean overall diameter of the hollow bodies measured parallel to a grinding surface is about three to 50 times as large as the mean grain diameter.

13. A grinding tool made from the grinding material as claim in claim 1 wherein the hollow bodies are bonded together.

14. A grinding tool as claimed in claim 13 wherein the hollow bodies are bonded to a base material to form a grinding or abrasive belt.

15. A grinding tool as claimed in claim 13 wherein the hollow bodies are bonded together to form a grinding body.

16. The grinding material of claim 1 wherein said hollow bodies are of a copolymer having abrasive grains of corundum.

17. A process for the production of a grinding material comprising expanding polymeric material to form a multiplicity of hollow bodies having a diameter of 0.1–8.0 mm, coating said hollow bodies with abrasive grains so that said abrasive grains are substantially in one layer, and depositing said coated material onto a substrate having a layer of bonding material.

18. A process according to claim 17 wherein said substrate is a belt.

19. A process according to claim 17 wherein said hollow bodies contain a grinding adjuvant.

20. A process as claimed in claim 17 wherein the abrasive grains are bonded by means of an age-hardening bonding material to the surfaces of hollow thermoplastic beads and the hollow bodies thereby formed are next heated to a temperature at which the hollow bead melts but the bonding material remains sufficiently firm.

*21. A grinding material as claimed in claim 1, wherein the hollow bodies are individual hollow spheres.*

*22. A grinding material as claimed in claim 1, wherein each hollow body consists of a thin walled bubble type carrier particle and said abrasive grains bonded to the walls of said carrier particle by said bonding means.*

*23. A grinding material as claimed in claim 1, wherein the bonding means is a synthetic resin and the abrasive grains are selected from the group consisting of molten aluminum oxide, molten zirconium oxide, mixtures of these oxides, silicon carbide, diamond, flint, graphite and emery.*

* * * * *